(12) United States Patent
Powers

(10) Patent No.: US 6,453,627 B1
(45) Date of Patent: Sep. 24, 2002

(54) SKIRT ASSEMBLY FOR MANUFACTURED HOUSING UNITS

(75) Inventor: Timothy Powers, 2020 Bagley, Flint, MI (US) 48504

(73) Assignee: Timothy Powers, Flint, MI (US)

( * ) Notice: Subject to any disclaimer, the term of this patent is extended or adjusted under 35 U.S.C. 154(b) by 4 days.

(21) Appl. No.: 09/685,373

(22) Filed: Oct. 10, 2000

(51) Int. Cl.[7] ............................................. B60R 27/00
(52) U.S. Cl. .................. 52/169.12; 52/68; 52/745.1; 52/184; 52/169; 52/86; 52/169.12; 52/143; 248/354.3
(58) Field of Search ................. 52/67, DIG. 11, 52/143; 248/351, 354.1, 357

(56) References Cited

U.S. PATENT DOCUMENTS

| | | | | |
|---|---|---|---|---|
| 3,808,757 A | * | 5/1974 | Greenwood | 52/184 |
| 3,827,201 A | * | 8/1974 | Struben | 52/169 |
| 4,656,797 A | | 4/1987 | Marquart | |
| 4,841,691 A | * | 6/1989 | Stoecker | 52/169.12 |
| 5,295,335 A | * | 3/1994 | Collier | 52/86 |
| 5,484,130 A | * | 1/1996 | Domanski et al. | 248/354.3 |
| 5,515,655 A | | 5/1996 | Hoffmann | |
| 5,690,305 A | | 11/1997 | Perkins | |
| 5,870,866 A | | 2/1999 | Herndon | |
| 6,018,921 A | | 1/2000 | Lindsay | |
| 6,035,590 A | | 4/2000 | Lindsay | |
| 6,119,412 A | * | 9/2000 | Jackson | 52/143 |
| 6,134,861 A | * | 10/2000 | Spude | 52/745.1 |
| 6,205,720 B1 | * | 3/2001 | Wolfrum | 52/169.12 |
| 6,223,479 B1 | * | 5/2001 | Stockli | 52/68 |

OTHER PUBLICATIONS

Article From "The Journal"—The Magazine for Manufactured Housing Professionals in Issue of Jul., 2000, Advertisement by JM Products, Inc. on Adjustable Studs.

* cited by examiner

Primary Examiner—Carl D. Friedman
Assistant Examiner—Steve Varner
(74) Attorney, Agent, or Firm—Dinnin & Dunn, P.C.

(57) ABSTRACT

A skirt assembly system for use on a mobile home. The skirt assembly system includes a plurality of telescoping studs. The skirt assembly system also includes a plurality of tracks wherein the stud are secured within the tracks with an edged of the stud facing out. The skirt assembly system also includes studs fastened to a side wall of the tracks. The skirt assembly system also includes a brace connected to the telescoping studs on one side thereof and connected to a bottom of the mobile home on an opposite end of the brace.

16 Claims, 2 Drawing Sheets

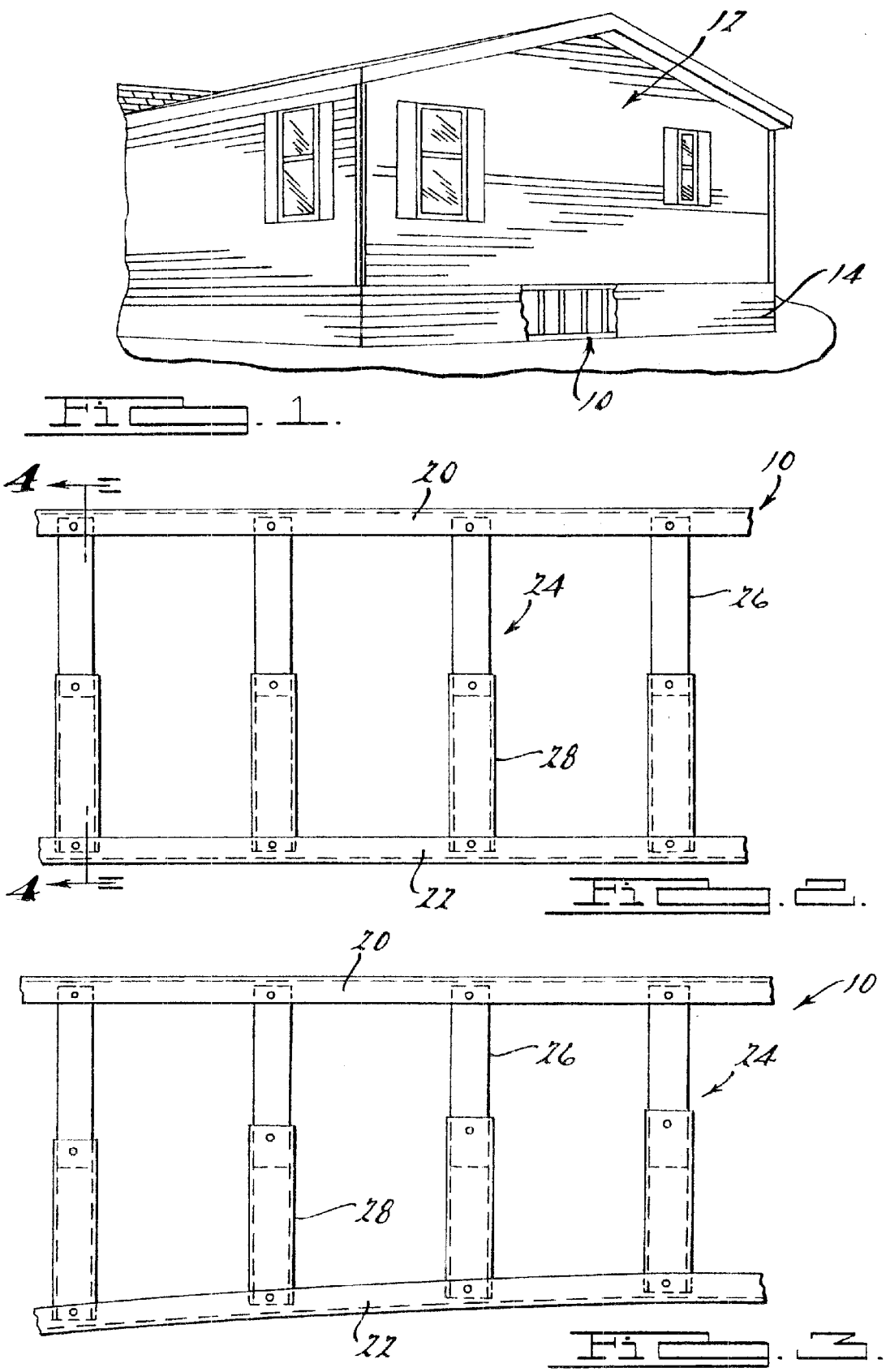

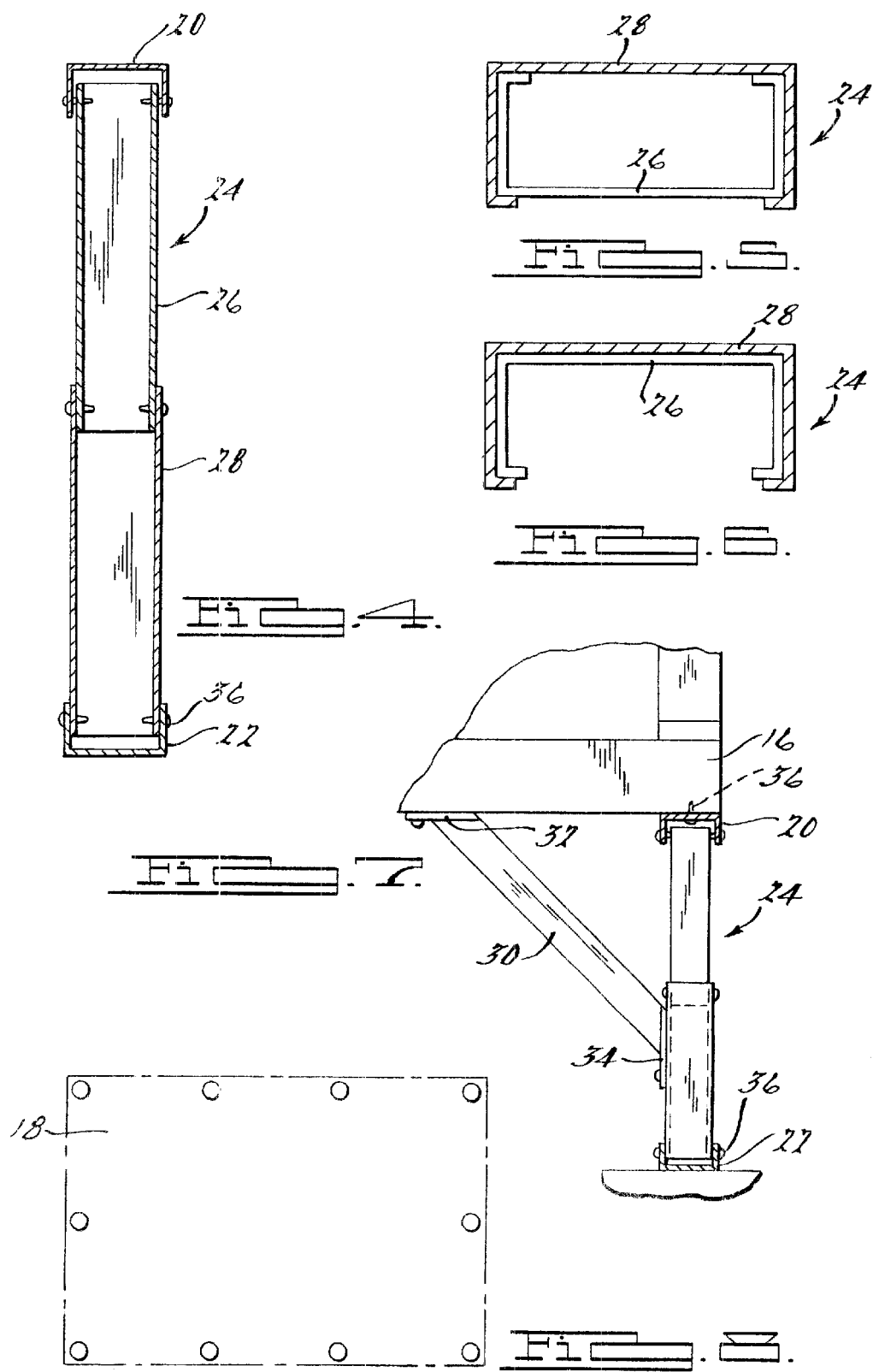

SKIRT ASSEMBLY FOR MANUFACTURED HOUSING UNITS

BACKGROUND OF THE INVENTION

1. Field of the Invention

The present invention relates to skirting for manufactured or mobile homes, and more particularly relates to skirt framing for use in holding a skirting material on or near the ground of a manufactured or mobile home.

2. Description of the Related Art

Manufactured homes, also known as mobile homes, modular homes or pre-manufactured homes have been known for many years and are commonly installed by being placed on concrete slabs or concrete footings or even on cinder blocks. Typically, the peripheral lower edges of the mobile home structures are unsupported. This will leave a gap between these unsupported lower edges and the ground. This gap in the past has been covered by a non-load bearing skirt fabricated from metal or other synthetic materials to simply provide a more pleasing appearance for the mobile home. However, over extended periods of time, the peripheral edges of these buildings will warp, sag or buckle and the skirts are generally not structurally sufficient enough to prevent this form of deterioration. There have been many attempts at different types of brackets to secure the skirting to the lower portion of the mobile home. Generally, the brackets are attached to the outside of the manufactured home and tend not to have any added arm support to keep the skirting material in proper position during adverse weather conditions or any other warping of the manufactured building. Also known in the art is to stake the bracket into the ground such that the manufactured building skirting does not move and is not blown away during inclement weather. However, this can prove to be time consuming and expensive and the staking can easily come out of the ground with freeze and thaw cycles.

Other prior art skirting methods include some type of adjustable studs where the studs are attached to the rim of the home and the bottom of the stud to the ground with spikes or rebar. The connection of the bottom of the studs to the ground generally does not last a long time and will eventually create an unpleasant appearance.

Therefore, there is a need in the art for a skirt framing system that will connect to the mobile home and provide a cost effective and pleasing appearance for the skirting attached to the lower end of a mobile home through all adverse weather conditions and be dependable for numerous years.

SUMMARY OF THE INVENTION

One object of the present invention is to provide a new and improved skirt framing system.

Another object of the present invention is to provide a skirt framing system that is adjustable via a pivot from a top track, which is attached to a mobile home.

Yet a further advantage of the present invention is to provide a more rigid edge for attaching the skirting to the skirt framing.

Yet a further object of the present invention is to have a suspended skirt framing system which is suspended from the floor joist of the mobile home.

Still a further object of the present invention is to create a free floating bottom track system for the skirt framing, so to adjust to contours in the slope of the ground.

Still a further object of the present invention is to provide a faster and more efficient way to secure the skirt framing to a mobile home such that it is parallel to the mobile home.

To achieve the foregoing objects the skirt framing assembly for use on a mobile home includes a plurality of telescoping studs. The skirt framing assembly also includes a plurality of tracks, wherein the studs are placed within the tracks. The studs are fastened to a side wall of the tracks. The skirt framing assembly further includes a brace which is connected to the telescoping studs on one side thereof and a bottom of the mobile home on the other side.

One advantage of the present invention is that the top of the stud is able to pivot within the top bracket of the framing system.

A further advantage of the present invention is that the adjustable studs are used on edge such that an edge of a stud extends outward and the skirting is connected directly to the edge of the stud for greater stiffness and durability.

A further advantage of the present invention is that the bottom track of the skirt framing system is not fixed to the ground which allows for better conforming to a slope underneath the mobile home.

A further advantage of the present invention is that the skirt framing system is a suspended system from the floor joist on the house.

Still a further advantage of the present invention is the ease of creating a parallel appearance of the skirting with the mobile home wall via the bracket system.

A further advantage of the present invention is the reduction in cost of labor in installation along with greater durability.

Other objects, features, and advantages of the present invention will become apparent from the subsequent description and appended claims, taken in conjunction with the accompanying drawings.

BRIEF DESCRIPTION OF THE DRAWINGS

FIG. 1 shows a plan view of the present invention.

FIG. 2 shows a side view of the skirt framing.

FIG. 3 shows a side view of the skirt framing on uneven ground.

FIG. 4 shows a cross section taken along the line 4—4 of FIG. 2 of the telescoping stud and top and bottom track.

FIG. 5 shows a cross section of a telescoping stud.

FIG. 6 shows a cross section of an alternate embodiment of the telescoping stud.

FIG. 7 shows the bracket connected to the telescoping stud.

FIG. 8 shows a pad for a manufactured home.

BEST MODE FOR CARRYING OUT THE INVENTION AND DESCRIPTION OF THE PREFERRED EMBODIMENT(S)

Referring to the drawings, a skirt framing assembly 10 according to the present invention is shown. FIG. 1 shows a mobile or modular home 12 or otherwise known as a premanufactured home, placed at a home site and including the skirt framing assembly 10 covered by a skirt 14 to provide a more a pleasing appearance to the mobile home 12. As shown, the skirt framing assembly 10 is connected to the house either directly to the floor joist 16 underneath the mobile home or to any other part of the underneath surface of the mobile home. Attached to the skirt framing assembly 10 is the skirting 14 which generally is made of either a thin metal composition or a synthetic plastic like composition to provide for a pleasing appearance that matches the siding on the mobile home.

As shown in FIG. 8 a mobile home 12 is generally placed on either a concrete pad or concrete pilings 18. In general, in the northern part of the world approximately every eight feet there are concrete footings to support the mobile home structure. Generally in the south they use a concrete pad or concrete runners to provide the same base for setting and placing the mobile home upon. The width of the concrete pad or concrete footings 18 generally is anywhere between fourteen to eighteen feet depending on the size of the mobile home and if the mobile home is a double wide. These pads or footings 18 are placed on a piece of land usually found within a mobile home community. As often is the case, within these mobile home communities the land is not perfectly flat and there are contours and slopes throughout the community. When a concrete footing and/or pad 18 is poured it is poured to be level so the mobile home 12 will be level for the occupants. However, the land or ground outside of the footings or pad can have a slope or slopes that create an angle with respect to the bottom of the mobile home 12. When the mobile home 12 is secured to the concrete footing it is placed upon a structural support system and/or foundation which provides approximately two to three feet of clearance from the mobile home 12 to the level of the ground. The skirt framing assembly 10 is then attached to the mobile home 12 and a skirting material 14 is placed to extend from the bottom of the mobile home 12 to the ground to provide for a more pleasing appearance for the mobile home.

FIGS. 2 and 3 show the skirt framing assembly 10 according to the present invention. The skirt framing assembly 10 includes a top track 20 and a bottom track 22 which are preferably made of a light gauge steel, i.e., approximately 25 gauge. However, it should be noted that any other type of rigid material, such as metals, wood, composites or hard plastics may be used depending on the needs and the environment of the mobile home. The top and bottom tracks 20, 22 generally have a U-shaped cross section. The top and bottom tracks 20, 22 will be in predetermined sectional lengths such as eight, ten, twelve, fourteen or sixteen foot sections depending on need and size of the mobile home 12. The preferred length is the eight foot section of the top and bottom tracks 20, 22. The top track 20 is fastened to the floor joist 16 of the mobile home 12 with any suitable fastener 36. In the preferred embodiment the suitable fastener is a galvanized pan head screw. The sections of the top track 20 are placed around the entire outer circumference of the mobile home 12. When the top track 20 is secured to the mobile home 12 the side walls of the U-shaped section extend down towards the ground. Directly opposite of the top track 20 and laying on the ground is the bottom track 22 which has its side walls of the U-shaped cross section extending up towards the top track 20. It should be noted that the bottom track 22 is not fixed by any means to the ground or footing underneath the mobile home 12. Prior art devices had problems when the bottom of the skirt framing assemblies had been fixed either by rebar, wooden stakes, metal stakes, or the like with heaving and erosion with the ground due to weather and climatic changes. Therefore, the bottom track 22 is "free floating" on the ground underneath the mobile home 12. The eight foot sections of the bottom track 22 allow for the contour of the slope to be followed by the track underneath the mobile home 12.

The skirt framing assembly 10 also includes a plurality of adjustable or telescoping studs 24. In the preferred embodiment the telescoping studs 24 are made of steel of a light gauge, i.e., approximately 25 gauge, however it should be noted that any other gauge steel or any other metal, wood, composite or plastic material may be used for the studs. The studs 24 are adjustable from a general range of approximately being fully collapsed at 20 inches to a maximum height of 36 inches in their fully extended position. The telescoping stud 24 is placed approximately every 16 inches on the center within the top and bottom track 20, 22. It should be noted that the studs could be placed at 24 inches on center or any other separation distance depending on the rigidity needed and the stiffness of the skirting material being used. The telescoping studs 24 include a first section 26 and a second section 28. The first section 26 of the stud 24 slides within the second section 28 of the stud. Both the first and second section 26, 28 of the studs generally have a cup shaped cross section. In the preferred embodiment the stud sections 26, 28 are nested within one another, i.e., the opening of the first stud section 26 faces the closed side of the second stud section 28 within which the first stud section slides. However, in another embodiment as shown in FIG. 5, the openings of the cup shaped sections of the telescoping stud sections 26, 28 face the same direction, therefore there is no nesting of the telescoping stud 24.

Upon installation of the telescoping stud 24 within the top track 20 and bottom track 22, the stud 24 is placed such that it is on edge, i.e., an edge of the telescoping stud 24 is adjacent to a side wall of the bottom track 22 and top track 20. This will provide for a stiffer and more rigid surface upon which to connect the skirting material 14. Prior art skirt framing assemblies used the longer side of their materials to attach the skirting which provided less rigidity and stiffness. With the telescoping stud 24 placed on edge within the bottom and top track 20, 22, the stud 24 is either collapsed to its minimum 20 inches or extended vertically in height until the bottom of the stud rests within the bottom track 22 and the top of the stud rests within the top track 20. Once the stud is engaged with the top and bottom track 20, 22 at least two fasteners are used to connect the top track 20 to the top of the stud 24. In the preferred embodiment two galvanized pan head screws are used to secure the studs 24 to the top track 20, one on each side of the top track 20 into the top of the stud 24. By initially only connecting the top track 20 to the mobile home 12 and the top of the stud to the top track 20 this creates a pivot point which allows the stud 24 to be pivoted to a preferred perpendicular position with the mobile home 12. If the mobile home 12 has any slope in its floors or is not perfectly level, the ability to pivot the stud before connecting the bottom track 22 to the bottom of the stud is critical. After the stud 24 is made perpendicular to the tracks and mobile home 12, at least two pan head screws in the preferred embodiment, however it should be noted that any other fastener may be used depending on the needs and the available equipment, are placed one on each side of the bottom track 22 into the bottom of the stud 24.

FIG. 3 shows the top track 20 level with the bottom of a mobile home while the bottom track 22 is placed on a slope on the ground underneath. FIG. 3 further shows the telescoping studs 24 in use whereas the far left stud is almost at its full open position while the far right stud has been telescoped to a reduced height to compensate for the slope underneath the mobile home 22. FIG. 7 shows that the skirt framing assembly 10 is suspended from the floor joist or the mobile home 16 such that only the top track 20 is secured to the house while the bottom track 22 free floats and is able to better follow a contour and conform to a contour or slope in the ground underneath the mobile home 12. After all of the telescoping studs 24 are secured in both the top track 20 and bottom track 22 along the entire other periphery of the mobile home 12, a plurality of braces 30 are then connected.

As shown in FIG. 7 the brace 30 is preferably made of a light gauge steel that has a preferred gauge of approximately 25, however, any other gauge of steel or any other metal, composite, or hard plastic material may be used depending on the environment and building materials available. The brace 30 generally has a first and second end 32, 34 and is suspended between the floor joist 16 of the mobile home and the stud members 24. In the preferred embodiment the braces 30 are placed every four feet in order to hold the tracks 20, 22 and studs 24 in a perfectly parallel line with respect to the mobile home 12. To connect assembling the brace 30 to the stud members 24 and floor joist 16 any suitable fastener is first connected to the floor joist or bottom 16 of the mobile home 12. It should be noted that the preferred embodiment fastener is a pan head screw but that any other suitable fastener available may be used. When the braces 30 are all connected to the floor joist 16 along one entire section of the track 20, 22 the section is then moved in or out with respect to the side of the mobile home 12, and may be checked with a level to ensure that it is parallel with the side of the mobile home 12, then a second fastener is placed through the brace 30 into an inside edge of the stud member 24 to hold it in a fixed parallel position with respect to the outside of the mobile home 12. This will ensure that the skirting 14 remains parallel to the mobile home 12 providing for a pleasing appearance from the outside. In some prior art skirting assemblies the skirt frame assembly would not be parallel to the mobile home side and hence have an appearance of the skirting falling in or being bowed out thus leaving it more vulnerable to weather and the like.

After installation of a brace 30 at approximately every four feet along the entire outer periphery of the skirt framing assembly 10 the installer will then attach the skirting 14 to the outside edge of each stud 24. The skirt framing assembly 10 will allow for a quicker and more efficient assembly job and provide a neater appearance that will withstand any weather conditions and last longer while still staying parallel to the mobile home 12.

Many prior art techniques for attaching framing and skirting to mobile homes would cause a step like look and leave open gaps between any sloped ground and the bottom of the skirting material. Therefore, the use of the current invention suspended skirt framing assembly 10 will allow for the bottom track 22 to completely follow the contour of any slope on the ground providing for a neater and more professional appearance of the skirting material. Furthermore, many prior art skirt framing assemblies have the top plate of any studs fixed or welded on to the bottom of the mobile home. This creates a situation where it becomes unusable because it will not pivot and allow for the studs to become perpendicular to any slopes on the ground or discrepancies and unlevelness of the mobile home floor. The use of the telescoping studs in the present invention with a flat surface, like that used in a 2×4 stud, creates greater stiffness and rigidity when applying the skirting material to the frame assembly. Most prior art systems do not use 2×4's or studs on edge, they use the larger flat surface. Hence, the present invention skirt framing assembly overcomes numerous problems as described above of the prior art skirt framing assembly while reducing the cost and improving the appearance of mobile home skirting.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A skirt assembly system for use on a home, said system including:
    a plurality of telescoping studs;
    a plurality of tracks, said plurality of tracks include a top and bottom track, said top track is connected to a floor joist of the home by a fastener, said bottom track is not fixed so as to conform to a slope, said studs secured within said tracks with an edge of said stud facing out, said studs fastened to a side wall of said tracks; and
    a brace connected to said telescoping studs on one side thereof and a bottom of the home on an opposite end.

2. The skirt assembly of claim 1 wherein said telescoping studs includes a first segment and a second segment, said second segment is nested within said first segment.

3. The skirt assembly of claim 2 wherein said studs are located at a predetermined location within said tracks.

4. The skirt assembly of claim 2 wherein said tracks having an adjustable length.

5. The skirt assembly of claim 4 wherein said length is approximately from 20 inches to 36 inches.

6. The skirt assembly of claim 1 wherein said stud is secured to said top track by at least two fasteners.

7. The skirt assembly of claim 1 wherein said bottom track receiving said stud after said studs connection to said floor joist, said stud secured to said bottom track by at least two fasteners.

8. The skirt assembly of claim 7 wherein said skirt assembly adjusts to various angles and contours.

9. A skirt framing assembly for use on a manufactured or mobile home on a pad or footing, the mobile home having a floor joist, said skirt framing assembly including:
    a plurality of adjustable studs, said studs telescope to a plurality of heights;
    a top and bottom track, said tracks receive ends of said studs, said bottom track is positioned on said ground directly beneath said top track, said bottom track follows the contour and slope of the ground, said studs are located at predetermined positions in said tracks, said top track is secured by a fastener to the mobile home, said studs are secured to said top track with at least two fasteners, said studs are adjusted to ensure contact with said bottom track, at least two fasteners secure said adjusted stud to said bottom track; and
    a bracket connected to said mobile home and said stud.

10. The skirt framing of claim 9 wherein said adjustable studs include a first portion and a second portion.

11. The skirt framing of claim 10 wherein said studs generally have a cup shaped cross section.

12. The skirt framing of claim 11 wherein said second portion is nested within said first portion, first and second walls of said second portion extend towards a base of said first portion.

13. The skirt framing of claim 10 wherein said studs have an approximate telescoping range of 20 to 36 inches in total length.

14. The skirt framing of claim 9 wherein a first fastener secures said brace to the mobile home initially, a second fastener secures said brace to said stud after said stud is perpendicular to a side of said mobile home.

15. The skirt framing of claim 9 wherein said studs are secured in said tracks on edge.

16. A skirt system for use on a manufactured or mobile home, said system including:

a plurality of telescoping studs;

a plurality of tracks having a top and bottom track, said studs secured within said tracks, said bottom track conforms to a slope; and a brace connected to said telescoping studs on one side thereof and the home on an opposite end.

* * * * *